(12) United States Patent
Simonpietri et al.

(10) Patent No.: US 11,065,563 B2
(45) Date of Patent: Jul. 20, 2021

(54) UP-FLOW WATER FILTRATION SYSTEM (71) Applicant: Atlantic Construction Fabrics, Inc., Richmond, VA (US)

(72) Inventors: Corey Simonpietri, Chesterfield, VA (US); Rinaldo Joseph DiLoreto, Jr., St. Augustine, FL (US); Scott Gorneau, South Portland, ME (US)

(73) Assignee: Atlantic Construction Fabrics, Inc., Richmond, VA (US)

( * ) Notice: Subject to any disclaimer, the term of this patent is extended or adjusted under 35 U.S.C. 154(b) by 0 days.

(21) Appl. No.: 16/777,992

(22) Filed: Jan. 31, 2020

(65) Prior Publication Data
US 2020/0246727 A1 Aug. 6, 2020

Related U.S. Application Data (60) Provisional application No. 62/801,779, filed on Feb. 6, 2019.

(51) Int. Cl.
| | |
|---|---|
| *C02F 1/00* | (2006.01) |
| *B01D 24/16* | (2006.01) |
| *B01D 24/00* | (2006.01) |
| *C02F 103/00* | (2006.01) |

(52) U.S. Cl.
CPC ........... *B01D 24/16* (2013.01); *B01D 24/007* (2013.01); *B01D 24/165* (2013.01); *C02F 1/004* (2013.01); *C02F 2103/001* (2013.01)

(58) Field of Classification Search
None
See application file for complete search history.

(56) References Cited

U.S. PATENT DOCUMENTS

| | | | |
|---|---|---|---|
| 6,648,549 B1 * | 11/2003 | Urriola | E02B 11/005 405/39 |
| 8,926,218 B1 * | 1/2015 | Savage | E03B 11/04 405/53 |
| 2015/0353383 A1 * | 12/2015 | Hirsch | B01D 35/1475 210/263 |

\* cited by examiner

*Primary Examiner* — Matthew O Savage
(74) *Attorney, Agent, or Firm* — John H. Thomas, P.C.

(57) ABSTRACT

The present up-flow water filtration system is made up of three or more layers. In the example of three layers, each layer is individually rigid and capable of supporting loads above it, and each serves a separate function. These layers include the inlet layer on the bottom of the system, the outlet layer at the top of the system, and the central layer in between which contains the filter media. Additionally, the system includes one or more vertical ports that are open above ground and that extend into the central layer and provide access to the central media containment layer for maintenance. There are also several layers of textiles which form the flexible outer casing, as well as internal membranes to separate the different layers and components of the system. Some systems may include inlet and outlet pipes, but other inlet and outlet configurations are possible.

14 Claims, 5 Drawing Sheets

UP-FLOW WATER FILTRATION SYSTEM

This application claims the benefit of U.S. Provisional Patent Application No. 62/801,779, filed Feb. 6, 2019, which is incorporated by reference herein in its entirety.

The present invention is directed to in-ground, up-flow water filtrations systems. Specifically, the present system is an internal frame system that provides flexible/modular installations that can be easily scaled according to individual installation design requirements.

BACKGROUND

There are a variety of proprietary and non-proprietary filtration systems available to remove pollutants from stormwater runoff. These filtration systems typically utilize either gravity or head pressure from the stormwater runoff to push the water through the filter. Most stormwater filters clean runoff as gravity pulls water down through a filtration media. This is typical of any non-proprietary bioretention system or sand filter, as well as several proprietary systems such as the StormFilter from Contech Engineered Solutions or the Perk Filter from Oldcastle. Some stormwater filtration systems filter water as it moves horizontally through a filtration media. This type of filter includes non-proprietary systems like submerged gravel wetlands and proprietary systems like the Modular Wetlands from Bio Clean Environmental.

Still other stormwater filtration systems utilize an upward flow of stormwater through the filtration media. These systems generally rely on upstream head pressure to push water up through the system to function. Proprietary systems that utilize an upward flow path for stormwater filtration include the Jellyfish from Contech, the Kraken from Forterra, and the Nutrient Removal Filtration System (NRFS) from Oldcastle. To generate the head pressure necessary to push water up through the filtration system, up-flow filters are typically buried below ground. As such they are typically encased in a concrete shell which serves two purposes. The shell must (1) support the weight of backfill, cover soils, and (possibly) vehicular traffic that could pass over the system, as well as (2) provide open space for the media and other components of the filtration system to operate.

All filters, regardless of which flow-path they use, include a filtration element. This element can be a textile (as in the Jellyfish or Kraken) or, more commonly, a media made of small particles designed to capture pollutants and/or sorb contaminants. When medias are used, they may be either incorporated into a cartridge as the StormFilter and Perk Filter do, or used in a uniform layer, as can be found in a traditional sand filter or the NRFS system. In both configurations, the concrete container is necessary to support cover and surface loads and provide the open space inside the filtration system to house the media and/or cartridges.

It is possible to construct an up-flow filter without a rigid frame, using the filtration media itself to support the weight of the upper portions of the system and cover soils. (Not all medias are suitable in this configuration, but there are several medias that can function under pressure from cover soils and vehicular loads.) However, there is one flaw in this type of design. Filtration medias used in up-flow configurations will eventually clog and/or expire. When this occurs, the media must be removed, discarded, and then replaced. If the media itself is supporting cover soils, there is no way to safely remove or replace the media without causing surface materials above the media to collapse. The only way to perform regular maintenance would be by digging out and removing all of the cover materials along with the upper portions of the system so that the media could be removed and replaced.

SUMMARY

Accordingly, it is an object of the present invention to solve the drawbacks of existing up-flow water filtration systems. The system described herein includes a rigid internal frame and a flexible outer containment layer. This system enables efficient installation and maintenance at an improved cost over concrete walled systems.

In one example, an up-flow water filtration system comprises a bottom water inlet layer, a media containment layer on top of the water inlet layer, and an outlet layer on top of the media containment layer. Each of the inlet, media containment and outlet layers comprises its own rigid internal support frame. The system further comprises a flexible outer containment layer that covers substantially the entire water filtration system, and a vertical maintenance port that is a hollow passage that extends from the top of the outlet layer, through the outlet layer and into the media containment layer; and further wherein a filtration media is positioned inside the media containment layer. The media containment layer has a length and width that define a media containment layer surface area, and the inlet layer has a length and width that define an inlet layer surface area, and the inlet layer surface area may be substantially 100% of the media containment surface area, whereby water is able to flow upwardly through substantially 100% of the inlet layer through the media containment layer. Alternatively, the inlet layer surface area is at least 90% of the media containment surface area, whereby water is able to flow upwardly through at least 90% of the inlet layer through the media containment layer. The outlet layer has a length and width that define an outlet layer surface area, and the outlet layer surface area may be substantially 100% of the media containment surface area, whereby water is able to flow upwardly through substantially 100% of the media containment layer to the outlet layer. Or alternatively, the outlet layer surface area is at least 90% of the media containment surface area, whereby water is able to flow upwardly through at least 90% of the outlet layer through the media containment layer. The media containment layer defines a three-dimensional space volume, and at least 70% of the media containment layer space volume may be void, but for the media positioned therein, or alternatively, at least 90% of the media containment layer space volume may be void, but for the media positioned therein, or still further alternatively, at least 95% of the media containment layer space volume may be void, but for the media positioned therein. The flexible outer containment layer may be water impermeable, or alternatively, water permeable. The system may further comprise a water inlet pipe that is in fluid connection with the inlet layer and that extends outside the system from a water source into the water inlet layer. The system may also further comprise a water outlet pipe that is in fluid connection with the outlet layer and that extends outside the system from the water outlet layer to outside the system. The vertical maintenance port may extend to the bottom of the media containment layer, and the vertical maintenance port may have open windows therein that are open to the media in the media containment layer. The flexible outer containment layer may alternatively be not rigid.

DETAILED DESCRIPTION

The present system, instead of using an external concrete shell as the container to support cover soils and house the filtration components, uses a rigid internal frame with a flexible outer containment layer. While the outer layer prevents backfill soils from entering the filter and contaminating the system, the rigid internal frame resists the pressures (both vertical and lateral) from the backfill materials while providing the open internal space for the system components to function. These two components (the outer containment layer and the rigid internal frame) work together to perform the same functions as a concrete walled system would perform, but they do so at a drastically reduced cost by having no concrete walls in the system. The present system includes components that provide a user-full access to the internal filtration media for removal and replacement once it has expired. This removal and replacement process can be completed from the surface, safely, thanks to the rigid internal frame which supports loads from cover soils and other loads without relying on the media for any structural support.

The system described herein can be pre-fabricated and shipped to a jobsite ready to be filled with filtration media on-site (for smaller systems), or it can be built in-place for larger systems. The smaller systems are modular and can be cross-connected to make them work together in the same way that a larger, built-in-place system would function.

The system components will now be discussed generally as follows.

The present system is made up of three or more layers. In the example of three layers, each layer is individually rigid and capable of supporting loads above it, and each serves a separate function. These layers include the inlet layer on the bottom of the system, the outlet layer at the top of the system, and the central layer in between which contains the filter media. Additionally, the system includes one or more vertical ports that are open above ground and that extend into the central layer and provide access to the central media containment layer for maintenance. There are also several layers of textiles which form the flexible outer casing, as well as internal membranes to separate the different layers and components of the system. Some systems may include inlet and outlet pipes/ports, but other inlet and outlet configurations are possible.

The Inlet Layer

All Up-Flow filters like that described in the present system receive water at the bottom of the system. Water will typically enter through a pipe connected to this lower layer, but other configurations are possible. For example, this could include water flowing directly into the inlet layer from an adjacent swale or pond.

The inlet layer (IL) is made up of a rigid, internal frame structure that provides open space for water to freely flow into the system. Typical systems will use a 9.45" open structure, but alternative configurations are possible. For the purposes of the present system, an open inlet layer will have a structure that is about 90 to 99% of internal void volume, or alternatively at least about 70% internal void volume, to facilitate the free flow of water into and around this layer. The larger and heavier the overall system, the relatively more load-bearing the inlet layer must be, which may mean less open space therein. If the overall system is relatively light, then the inlet layer may be more open.

This inlet layer is completely modular and scalable, and it will typically be the same width and length dimensions as the surface area width and length of the filtration media above it, providing flow to 100% of the media for efficient system usage. Since the inlet layer is low and the outlet is elevated, this layer will typically remain submerged, but weep holes can optionally be included in the outer casing if draining the system between rain events is desired and the surrounding ground layer can support it.

Media Containment

The media containment layer (MCL) is the backbone of the system described herein. It must be capable of supporting loads above the system while also providing significant open area to house the media responsible for removing pollutants. Achieving these two goals is what makes this layer the most difficult. There must be enough internal structure to support loads, yet the layer must remain open enough to provide access for maintenance. The MCL support structure can be made of metals, polymers, or a combination of materials. One suitable frame is formed from polypropylene, which can provide both strength and open area, as well as long-term resistance to degradation from water. The media used in the MCL could be a variety of materials, from non-proprietary filters like sand, slag, or mulch, to proprietary medias like, in one example, Focal-Point media.

The exterior components of the media containment layer may in one example have more structure to maximize strength and support loads. This is possible, since no maintenance is necessary beyond this outer limit. The edges of this media containment layer also provide support to the external textiles, bracing them against the pressures of backfill soils on the sides of the system when the system is backfilled. This lateral loading is typically secondary to the more extreme vertical loads, but it is an important consideration for the internal frame structure.

The inner structure of the media containment layer balances the need for strength to support loads from cover soils and any potential overhead vehicular traffic with the need for as much open space as possible. Here, the rigid structure can take multiple forms to find the right balance. For example, in applications with minimal burial depth and where the surfacing materials will not be subjected to traffic loads, open space within the MCL will be maximized. However, in areas where the surface above the system is an active roadway or parking lot, some of the open space within the layer will be reduced to allow for inclusion of more structural support. Typical internal void volume will be above 70% and will peak at 99%. In most applications, above about 90 or about 95% internal void volume provides an ideal balance between structural support and ease of access.

The total thickness of this layer is important, as it limits the depth of media that can be used. Medias like sand, which function via physical (mechanical) filtration, may require relatively thin layers of 12-24". Other medias that function primarily on absorption or adsorption may require extended contact time between polluted stormwater and the media. To achieve this longer contact time, media thicknesses could typically range from 24" to 48" or more. The MCL is able to adapt to designs that accommodate differing medias at differing depths.

Most filtration medias identify an ideal functioning depth that balances effectiveness with speed of water flow through the filtering particles (hydraulic conductivity) of the media. Since this depth can vary from one media to another, the depth of the MCL must also be variable to account for different medias.

There are typically no lateral inlet or outlet connections in the MCL, as the system seeks to push water upwardly and evenly through a controlled depth of media.

The Outlet Layer

Water enters the outlet layer (OL) of the system at the bottom of the outlet layer (from the MCL) and typically exits through a pipe connected to a storm sewer system, or possibly to daylight, but other configurations are possible. For example, this could include water flowing directly into an adjacent swale or pond.

The outlet layer is made up of a rigid, internal frame structure that provides open space for water to freely flow from the outlet area into a discharge area. Typical systems will use a 9.45" open structure, but alternative configurations are possible. This layer is completely modular and scalable, and it may have the same length and width dimensions as the length and width surface area of the filtration media below it, providing complete access to 100% of the media for efficient system usage. Since the outlet layer is above the filtration media, the discharge piping is typically just above the elevation of the filtration media. That means that this outlet layer will typically remain dry.

While loading from cover soils and vehicles will be distributed to each of the layers, the outlet layer is the only one that receives these pressures directly. In addition, unlike the IL but similar to the MCL, it must be able to accommodate the large maintenance ports that allow access to the MCL, as these ports must run directly through the OL.

Access Ports for Media Removal/Fill

Virtually all filtration medias have a limitation on effective life expectancy. As such, at some point during the life of the filtration system, the media will probably require removal and replacement. The access ports provide this capability. The access ports are large pipes or shafts that extend down to and through the outlet layer and into but not all the way through the media containment layer. The access ports may be made from 12" Schedule 40 PVC pipe, but could be fashioned from other materials as well.

Where an access port passes through the OL, perforations are drilled into the port/pipe to prevent water which has passed through media and into the access port from being trapped inside the pipe. The perforations allow that water to escape the access port and pass freely into the OL. Where the access port enters the MCL, large openings are cut into the port/pipe to maximize access to the filtration media. The access port terminates at or near the bottom of the MCL, and it does not enter the IL.

Most up-flow filtration systems will require multiple access ports. Typically, the larger the footprint of the system, the more access ports that will be necessary. One additional factor that determines the number of access ports is the configuration of the MCL. As noted in the MCL section above, the make-up of the MCL can be varied to provide adequate support for cover soils and surface loads. As these loads increase, the structural members of the MCL also increase, which can reduce access to the media for maintenance. When access is reduced, more access ports are added to the system to compensate.

Layers/Textiles

The exterior shell of the present system is typically made from a heavy (8-10 oz/sy) nonwoven geotextile, which provides a cushion to help protect the inner components from activities outside of the filter itself, such as general handling and backfilling. For pre-fabricated systems, this exterior shell could also include lifting straps to facilitate shipping and installation of the system.

Inside of this exterior shell is a casing material designed to contain water within the system. It is typically made from 30 mil PVC, but other flexible geomembrane materials could be used. It is also possible that an external casing is not desirable at all, and that water passing into the surrounding soils is acceptable, or even preferable. Whenever an impermeable casing is desired, an internal cushion envelope is needed to protect the impermeable casing from the inner components. This initial envelope, like the exterior shell, is typically made from a heavy (8-10 oz/sy) nonwoven geotextile.

One additional layer of textile is required to wrap the MCL. This textile must be highly permeable to prevent clogging but also contain media within the MCL. Permeability is needed to maximize the flow of water from the IL to the MCL to the OL. Ideally, the hydraulic conductivity of the filtration media should be the primary restriction of flows through the system, not the textile MCL envelope. At the same time, however, the openings in the MCL envelope must be small enough to prevent the filtration media from flowing up with filtered water into the OL, or being pulled through the MCL envelope down into the IL. Whatever type of material is chosen, it must also be fashioned into a boot to seal the access ports between the OL and MCL, extending through the OL to cover the perforations in the access port within the OL to prevent filtration media from escaping through the access port into the OL.

While the outer shell layer, casing layer and internal shell layer together with the MCL wrap layer may be formed of the materials noted above, other alternative materials may optionally be used. These other materials may have different thicknesses, may be formed of other polymers or natural or metal materials, and may be deployed in different orders. Also, additional layers of similar functionalities may be added to the system. Finally, fewer layers may alternatively be deployed for a given system and its specifications.

How the System Works

In many applications, polluted stormwater runoff will be captured upstream of the filtration system described herein in a wet pond, stormwater swale, or other surface impoundment. The outlet of the up-flow filter system described herein is typically at about the same elevation as the normal water elevation of the upstream containment pond, which allows the filter system to remain submerged while the upstream system retains the appropriate engineered condition (which could be either filled to the lower limit for wet ponds or completely empty for dry ponds). As runoff begins to build up in the upstream system (a wet pond for example), water will flow out of the pond through an outlet control structure and into the IL of the filter system. Since the system is submerged, water will immediately begin being pushed up through the textile between the IL and MCL, and into the media contained within the MCL. As contaminated runoff passes through the MCL, sediment particles may be trapped in the filtration media while other pollutants may be absorbed or adsorbed, depending on the nature of the filtration media being used. Once runoff passes completely through the MCL, it passes through the MCL textile envelope and enters the OL where it will flow into the outlet pipe/port out of the system and into the storm sewer or other downstream system.

During a more extreme rainfall event, excess water can be routed around the system to prevent flooding. In some instances, it may be preferable to connect this bypass pipe directly to the OL of the filtration system, allowing water to discharge through the system outlet pipe without being cleaned by the system.

Maintenance

When the filtration media becomes clogged, has expired, and/or is due for replacement, it can be extracted through the access ports. These ports are typically capped at the surface, so the lid/cover must be removed, and then vacuum equipment can be inserted into the access port. Typical vacuum equipment consists of a 4-6" vacuum hose and jetting equipment capable of mobilizing particulates within the MCL. Camera equipment can also be utilized to verify adequate media removal has been achieved. Once all the filtration media has been removed, media of a similar type can be reinstalled within the MCL through the access ports. Typically, this media will be delivered in large sacks with a spout on the bottom which can be used to funnel the media back into the access port and spread throughout the MCL.

The attached figures illustrate examples of the water filtration system described herein. Individual installations may include numerous small variations and modifications depending on those individual needs and topography.

Figure 1:
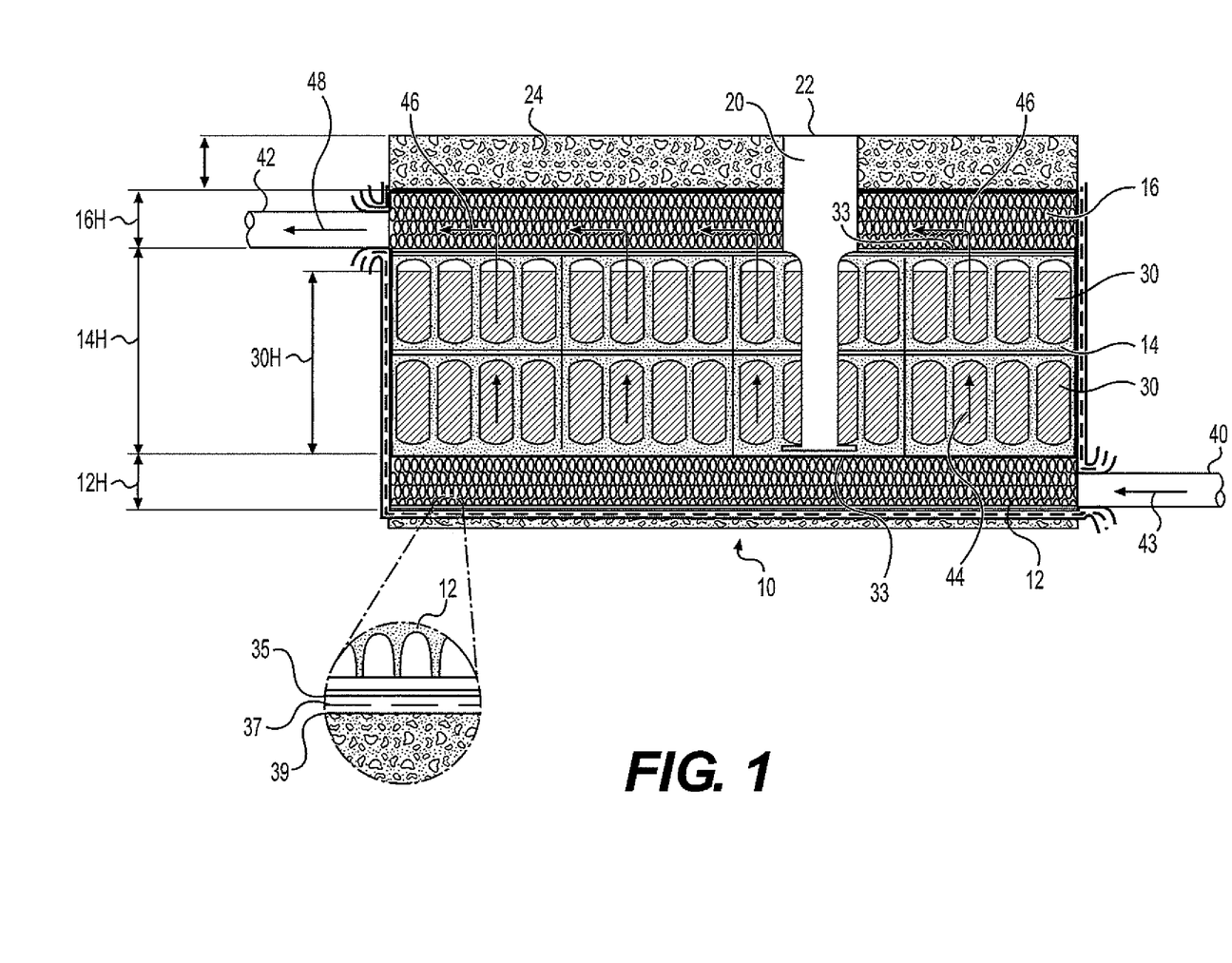
FIG. 1 is a side view of one example of an up-flow filtration system as described herein.

FIG. 1 is a side view of an up-flow water filtration system 10 as it would be installed in the ground. The filtration system 10 includes an inlet layer 12 positioned at the bottom of the system, a media containment layer 14 above the inlet layer, and an outlet layer 16 above the media containment layer. Each of the inlet layer 12, media containment layer 14 and outlet layer 16 is vertically supported by internal framing. A vertical maintenance port 20 extends into the system 10 from above the outlet layer 16 at the top of the system. The vertical maintenance port 20 has a top 22 that provides access to the port. This top is at or near the top level of rock or backfill 24 that is installed above the filtration system 10. The height 12h of the inlet layer 12 is shown. Since this inlet layer 12 is mostly open space, water that enters the system 10 will flow freely into and around the inlet layer. The height 12h does not need to be very large to accomplish the purpose of distributing water around the cross-sectional area defined by the length and width of the inlet layer 12. The media containment layer height 14h is shown. The media containment layer height 14h is carefully engineered to hold a specific amount of filtration media 30 to accomplish the purpose of filtration of the system 10. The media height 30h is shown in the media containment layer 14. The type of filtration media 30 and the media containment layer height 14h are engineered in tandem to create an effective amount and space for the media in the layer. The cross-sectional area of the media containment layer 14 is defined by the length and width of that layer. The outlet layer height 16h is also shown. This outlet layer 16 is mostly open volume space. Therefore, the outlet layer height 16h does not need to be large to handle the free flow of water through this section of the system, but must be tall enough to connect the optional outlet pipe, if used. The cross-sectional area of the outlet layer 16 is defined by the length and width of that layer.

Water enters the system 10 through inlet pipe 40 and exits the system through outlet pipe 42. The water flow is illustrated by directional arrows 43, 44, 46 and 48 as it flows through the inlet pipe 40 into the inlet layer 12, upwardly through the media containment layer 14, through the outlet layer 16 and out the outlet pipe 42 respectively. During this progression of flow, dirty water 43 is filtered by the filtration media 30 in the media containment layer 14 so that water outflow 48 is filtered water when it leaves the system 10.

Importantly, the media containment layer 14 is wrapped and surrounded by a microgrid mesh 33 to hold the media 30 and retain it in the layer. The entire filtration system 10 is wrapped on the bottom and all sides by a three-layer flexible combination of an inside nonwoven geotextile 35, a middle layer impermeable PVC liner 37, and an outside layer of nonwoven geotextile 39. These flexible outer layers 35, 37 and 39 encapsulate the system 10 and prevent backfill or other dirt from penetrating into the system 10 so that the filtration system is allowed to operate efficiently.

Figure 2:
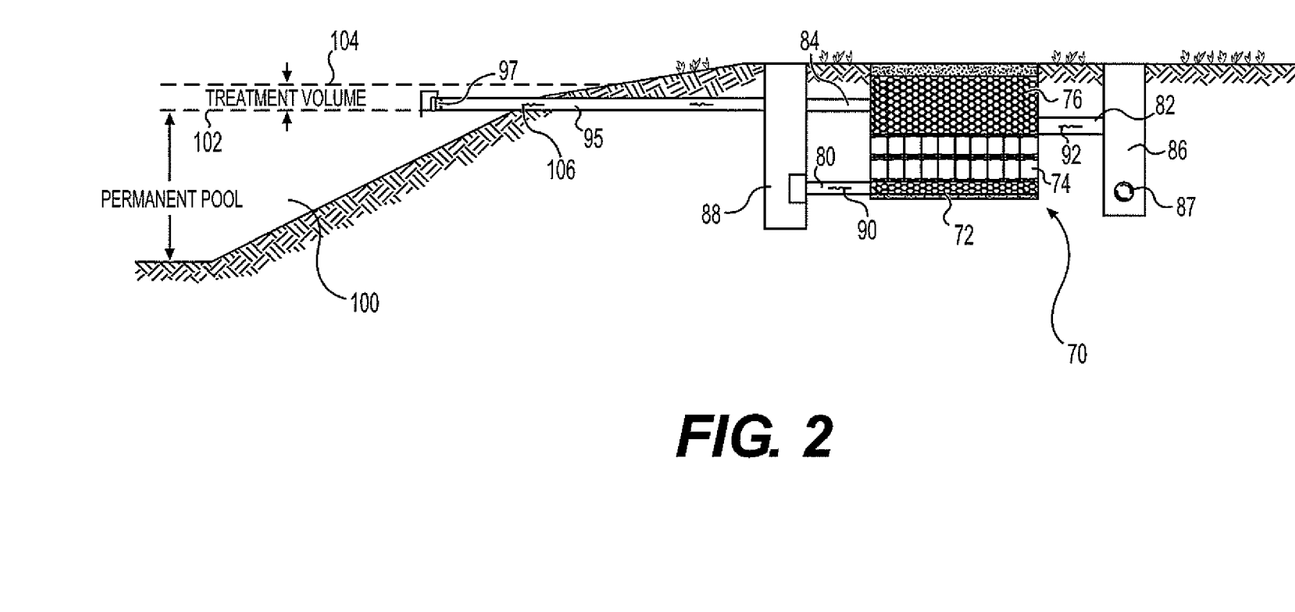
FIG. 2 is a side view of a second example of an up-flow filtration system as described herein.

FIG. 2 illustrates another example of an up-flow water filtration system 70. This system 70 flows from left to right as shown, as compared to FIG. 1 where the water flow was from right to left in that system 10. The direction of flow horizontally does not functionally make any difference to the system. The filtration system 70 includes water inlet layer 72, media containment layer 74 and water outlet layer 76. The system is configured next to a stormwater wet detention pond 100. The pond 100 has a permanent water level 102 and a treatment volume level 104 which provides for the filtration of water when the water level rises above the permanent pool level 102. When the water rises above the permanent level 102, water flows through a skimmer 97 into a pipe 95. Water 106 flows into a basin 88. At the bottom of the basin 88 there is a filtration system water inlet pipe 80 that guides the flow of water 90 into the system 70. There is also shown an overflow pipe 84 that allows excess water to pass straight into the outlet layer 76 of the system. Water flows through this overflow pipe 84 only when the filtration system 70 cannot keep up with the flow of water into the basin 88 and through the system 70. Water flow 92 subsequently leaves the system 70 through pipe 82 to another basin 86 that catches the outflow and guides it to an outfall pipe 87. In this FIG. 2, there is not shown any vertical access pipe, but such a pipe would be included as part of the system 70 as an access and maintenance structure.

Figure 3:
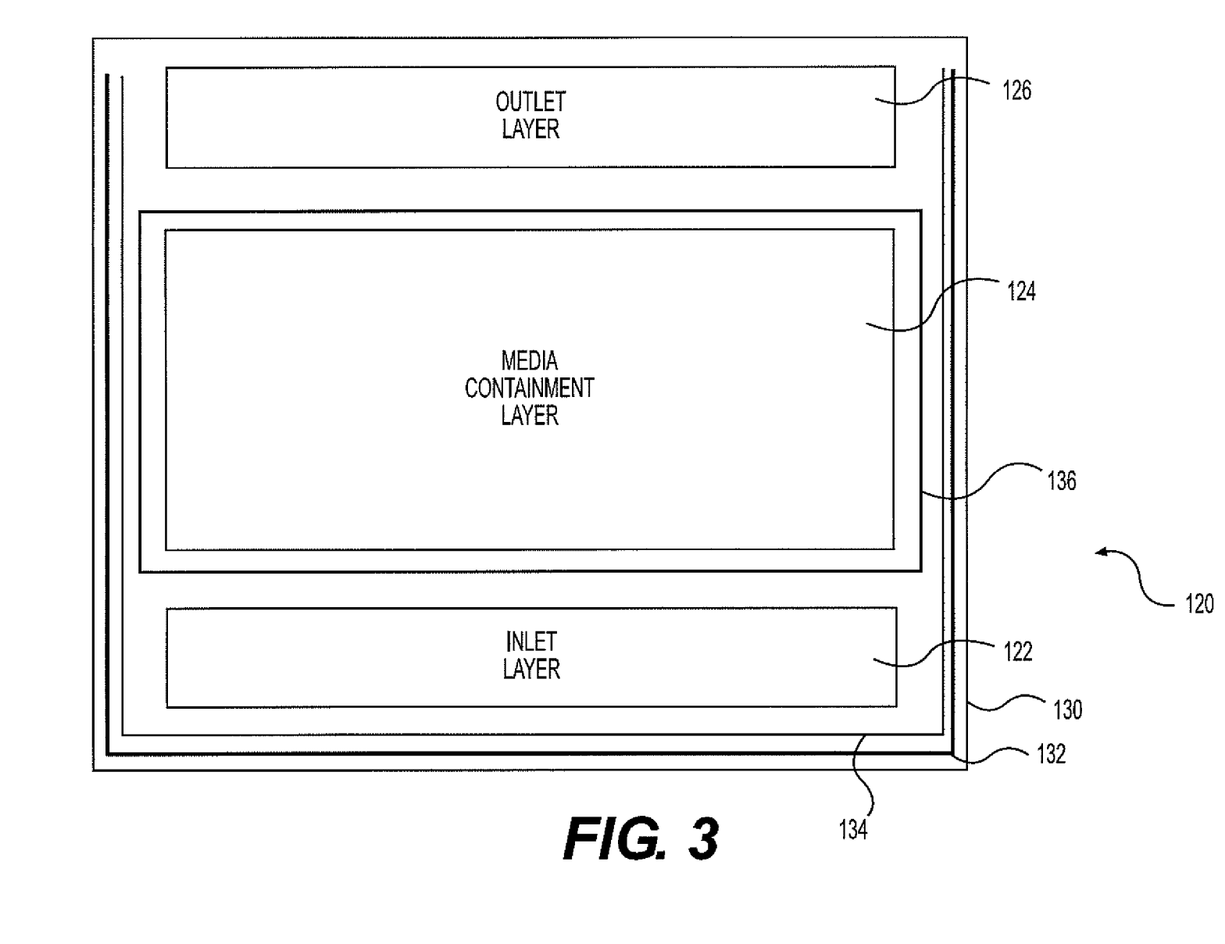
FIG. 3 is a schematic side view of a filtration system as described herein illustrating details about the flexible layers used to wrap various components of the system.

FIG. 3 is a schematic view of a water filtration system 120 with emphasis on the flexible membranes that surround the system and system components. The system includes the inlet layer 122, the media containment layer 124 on top of the inlet layer, and the outlet layer 126 on top of the media containment layer. The media containment layer is shown being fully wrapped on all sides in a micromesh fabric 136. Functionally, this fabric 136 is intended to allow water to easily flow through it and yet still physically contain the media inside the media containment layer 124. The entire system 120 is wrapped in three layers of flexible fabrics. The inside layer 134 is a nonwoven, cushion geotextile. The middle layer 132 is a PVC, impermeable film, although alternatively, this layer may be permeable if the particular application can accommodate it or it is preferred. The outside layer 130 is also a nonwoven, cushion geotextile. These layers protect from exterior dirt or stone penetrating and filling the system 120. There may be fewer than the three layers 130, 132 and 134 used. There could alternatively be simply a single layer or two layers or more layers used to wrap the system as shown. This is clearly seen in FIG. 3 where fewer and more layers could be used. Additionally, this particular system 120 illustrates three layers 130, 132 and 134 wrapped around the bottom and sides to the system 120. Only the outside layer 130 is covering the top of the system 120, although other configurations are possible. Depending on what materials and how much material and the installation location. Additional flexible layers may alternatively be used to cover the top of the system 120. And finally, FIG. 3 is used to emphasize the flexible layers, so it does not show the vertical access pipe that would also be a part of that system.

Figure 4:
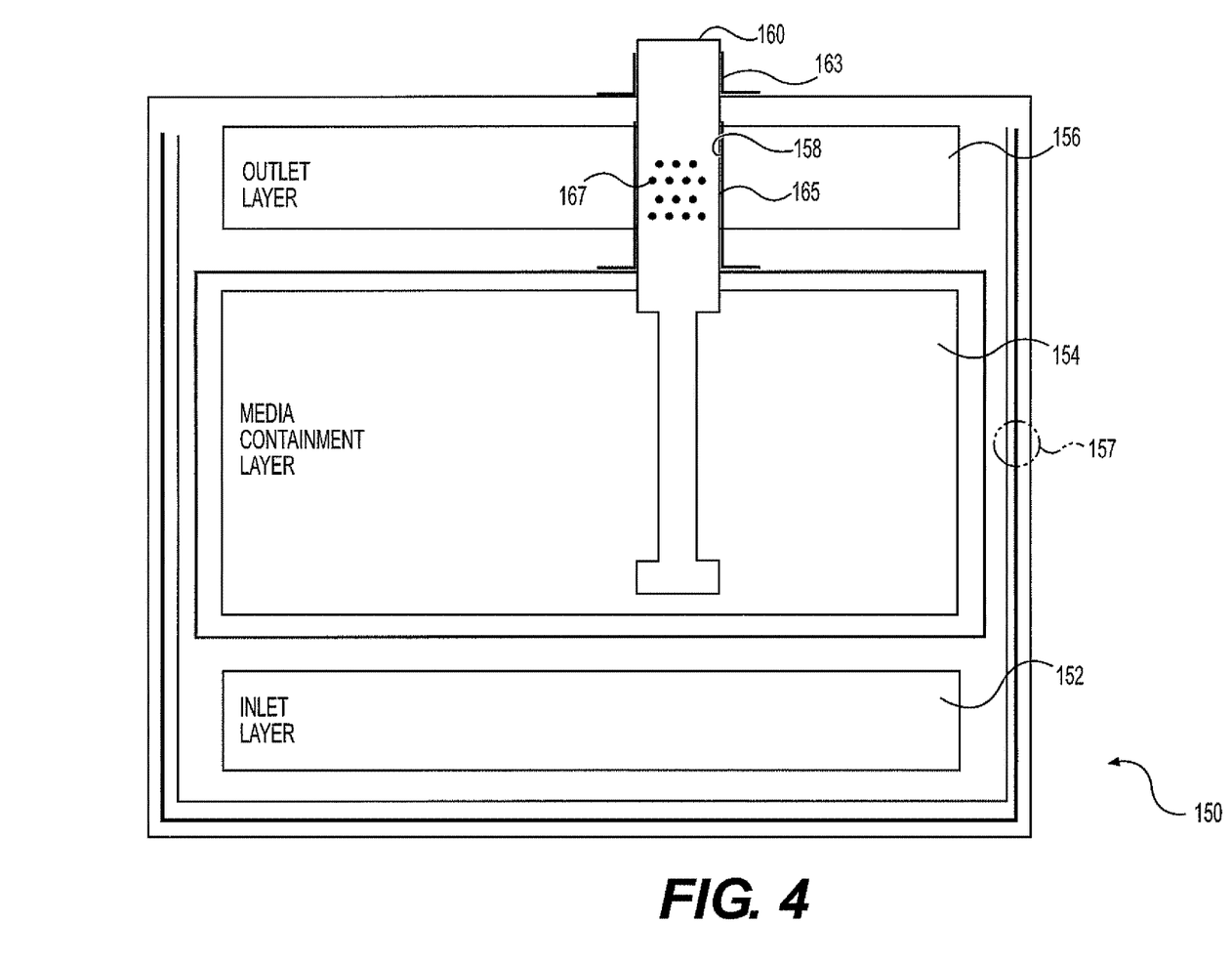
FIG. 4 is a schematic side view of a filtration system as described herein illustrating the vertical access port construction.

FIG. 4 is a schematic view of a filtration system 150 with emphasis on the vertical access port 158 that is used to access and service the filtration system. The system 150 includes an inlet layer 152 on the bottom of the system, a media containment layer 154 in the middle, and the outlet layer 156 on top. The system 150 has three layers 157 of a flexible material covering the sides and bottom of the system, while only one of the three layers is used to cover the top of the system. The vertical access port 158 extends from outside the top of the system 150, through the outlet layer 156 and through and to the bottom of the media containment layer 154. Alternatively, this access port 158 could extend into, but not all the way to the bottom of the media containment layer 154. A nonwoven geotextile boot 163 is positioned around the access port 158 at the top of the system 150 to prevent covering dirt or backfill from falling into the system. The section of the access port 158 that extends through the outlet layer 156 has perforations 167 in it. This section of the access port 156 is covered with a micromesh boot 165 all across and around the height of the port that passes through the outlet layer 156. The boot 165 is typically made from the same material as the media containment envelope (136 in FIG. 3), but other materials could be used. The perforations 167 allow for water entering the access port 156 through the media containment layer 154 to exit the port into the outlet layer 156. The micromesh boot 165 surrounding the access port 158 through the outlet layer 154 will keep filter media from floating or mixing in the overflow water and filling or clogging the outlet layer.

Figure 5A:
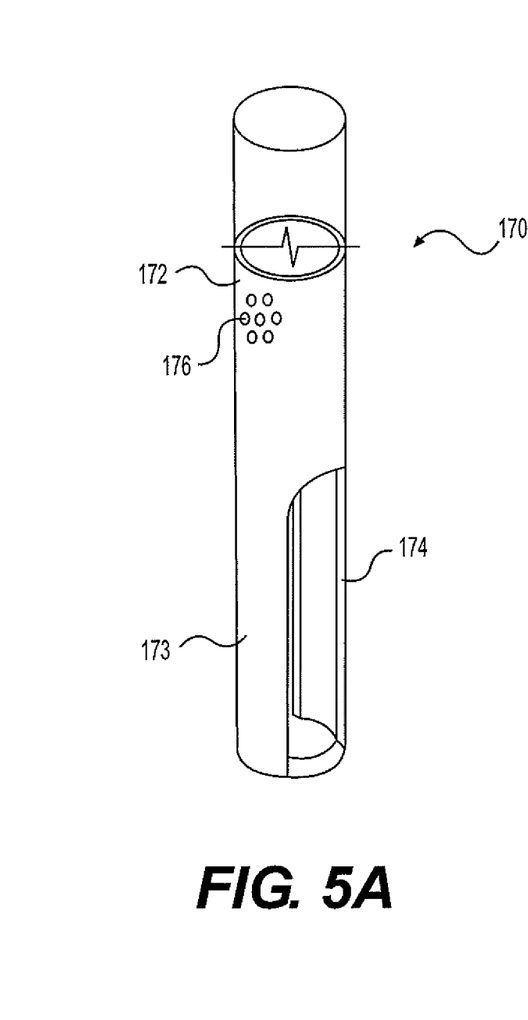
FIGS. 5A and 5B illustrate a vertical maintenance port alone and in the water filtration system, respectively.
Figure 5B:
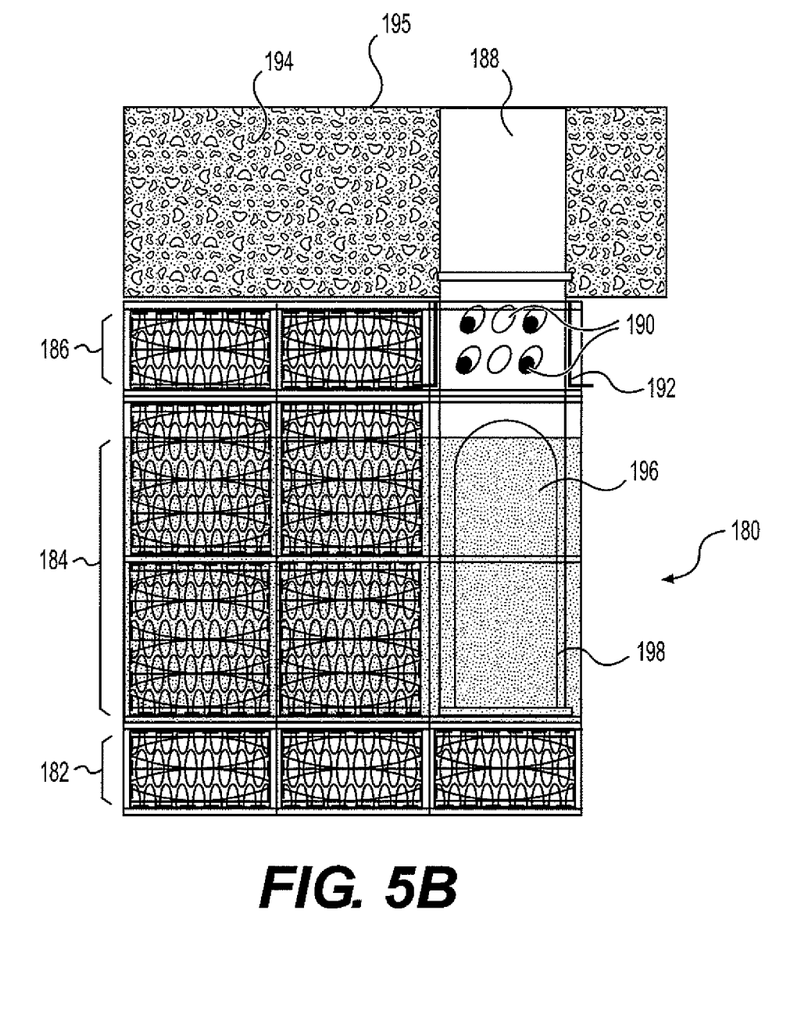

FIGS. 5A and 5B illustrate the construction of the vertical access port having openings/windows along the vertical length of the access port so that a hose may be inserted into the media confinement layers. Referring to FIG. 5A, there is shown a vertical maintenance port 170 that consists of a round pipe 172. In the bottom portion 173 of the pipe 172, there is shown a cutout window 174. There is a similar cutout window (not shown) on the back side of the pipe 172. The pipe 172 also has perforations 176 therein above the windows 174. The windows 174 are engineered to fit in the media containment layer of a filtration system, and the perforations 176 open the inside of the pipe 172 and provide openings into the outlet layer of a filtration system.

FIG. 5B illustrates a portion of a water filtration system 180 having an inlet layer 182, a double media containment layer 184 and an outlet layer 186. A vertical maintenance port 188 extends from ground level 195 of a fill layer 194 above the system 180 through the outlet layer 186 and into and to the bottom of the media containment layer 184. The media containment layer 184 is filled with media 196. The windows 198 in the vertical maintenance port 188 allow a user to extend a vacuum hose or other maintenance tool through the port and down to the level of the media 196. If the media 196 is determined to be due for replacement, then the hose can vacuum up the used media and clear out the media containment layer 184 by accessing that layer through the windows 198. If new media is required to fill back in, then a pump hose can insert fresh media into the media containment layer 184 through the windows 198. The perforations 190 in the vertical maintenance port 188 allow water to flow out of the port and into the outlet layer 186 in the event of a rise in water lever in the port. The vertical maintenance port 188 is wrapped with a porous textile fabric like a microgrid 192 so that if there is a water overflow through the perforations 190, then the media 196 is filtered by the microgrid and cannot flow into the outlet layer 186.

Other embodiments of the present invention will be apparent to those skilled in the art from consideration of the specification. It is intended that the specification and figures be considered as exemplary only, with a true scope and spirit of the invention being indicated by the claims.

That which is claimed is:

1. An up-flow water filtration system comprising:
a bottom water inlet layer, a media containment layer on top of the water inlet layer, and an outlet layer on top of the media containment layer;
each of the inlet, media containment and outlet layers comprising its own rigid internal support frame;
a flexible outer containment layer that covers substantially the entire water filtration system; and
a vertical maintenance port that is a hollow passage that extends from above the top of the outlet layer, through the outlet layer and into the media containment layer;
and further wherein a filtration media is positioned inside the media containment layer.

2. An up-flow water filtration system as described in claim 1,
wherein the media containment layer has a length and width that define a media containment layer surface area, and the inlet layer has a length and width that define an inlet layer surface area, and the inlet layer surface area is substantially 100% of the media containment surface area,
whereby water is able to flow upwardly through substantially 100% of the inlet layer through the media containment layer.

3. An up-flow water filtration system as described in claim 1,
wherein the media containment layer has a length and width that define a media containment layer surface area, and the inlet layer has a length and width that define an inlet layer surface area, and the inlet layer surface area is at least 90% of the media containment surface area,
whereby water is able to flow upwardly through at least 90% of the inlet layer through the media containment layer.

4. An up-flow water filtration system as described in claim 1,
wherein the media containment layer has a length and width that define a media containment layer surface area, and the outlet layer has a length and width that define an outlet layer surface area, and the outlet layer surface area is substantially 100% of the media containment surface area,
whereby water is able to flow upwardly through substantially 100% of the media containment layer to the outlet layer.

5. An up-flow water filtration system as described in claim 1,
wherein the media containment layer has a length and width that define a media containment layer surface area, and the outlet layer has a length and width that define an outlet layer surface area, and the outlet layer surface area is at least 90% of the media containment surface area,
whereby water is able to flow upwardly through at least 90% of the outlet layer through the media containment layer.

6. An up-flow water filtration system as described in claim 1,
wherein the media containment layer defines a three-dimensional space volume, and at least 70% of the media containment layer space volume is void, but for before the media is positioned therein.

7. An up-flow water filtration system as described in claim 1,
wherein the media containment layer defines a three-dimensional space volume, and at least 90% of the media containment layer space volume is void, but for before the media is positioned therein.

8. An up-flow water filtration system as described in claim 1,
wherein the media containment layer defines a three-dimensional space volume, and at least 95% of the media containment layer space volume is void, but for before the media is positioned therein.

9. An up-flow water filtration system as described in claim 1,
wherein the flexible outer containment layer is water impermeable.

10. An up-flow water filtration system as described in claim 1,
wherein the flexible outer containment layer is water permeable.

11. An up-flow water filtration system as described in claim 1,
further comprising a water inlet pipe that is in fluid connection with the inlet layer and that extends outside the system from a water source into the water inlet layer.

12. An up-flow water filtration system as described in claim 1,
further comprising a water outlet pipe that is in fluid connection with the outlet layer and that extends outside the system from the water outlet layer to outside the system.

13. An up-flow water filtration system as described in claim 1,
wherein the vertical maintenance port extends to the bottom of the media containment layer.

14. An up-flow water filtration system as described in claim 1,
wherein the vertical maintenance port has open windows therein that are open to the media in the media containment layer.

* * * * *